United States Patent [19]

Björk

[11] Patent Number: 5,466,318
[45] Date of Patent: Nov. 14, 1995

[54] METHOD FOR MANUFACTURING A FABRIC-LIKE LAMINATE AND A PRODUCT MANUFACTURED ACCORDING TO SAID METHOD

[75] Inventor: Bengt Björk, Saffle, Sweden

[73] Assignee: Duni AB, Sweden

[21] Appl. No.: 244,986

[22] PCT Filed: Dec. 18, 1992

[86] PCT No.: PCT/SE92/00882

§ 371 Date: Jun. 20, 1994

§ 102(e) Date: Jun. 20, 1994

[87] PCT Pub. No.: WO93/12936

PCT Pub. Date: Jul. 8, 1993

[30] Foreign Application Priority Data

Dec. 20, 1991 [SE] Sweden ........................ 9103810

[51] Int. Cl.[6] ................ B31F 1/12; B32B 7/14
[52] U.S. Cl. .............. 156/183; 156/324; 156/291; 162/112; 162/280; 264/282
[58] Field of Search ................ 156/183, 324, 156/549, 291; 162/112, 280, 127, 132, 133; 428/152, 153, 154, 904.4; 264/282; 427/391, 395, 411

[56] References Cited

U.S. PATENT DOCUMENTS

| 2,014,460 | 9/1935 | Alm | 428/154 |
| 3,044,896 | 7/1962 | Warner | 427/411 |
| 3,672,949 | 6/1972 | Brown | 156/291 |
| 5,143,776 | 9/1992 | Givens | 428/194 |

FOREIGN PATENT DOCUMENTS

| 2281916 | 12/1987 | Japan | 156/324 |
| 1200235 | 7/1970 | United Kingdom . | |

Primary Examiner—Michael W. Ball
Assistant Examiner—Sam Chuan Yao
Attorney, Agent, or Firm—Ostrolenk, Faber, Gerb & Soffen

[57] ABSTRACT

A laminate of creped tissue paper, which is wet-strength-treated and which has the required qualities for tablecloths, such as drape, heaviness, softness and tensile strength. The laminate is formed by applying an adhesive to a first tissue paper in patterns to form a first web. The first web is then laminated to another tissue paper web by means of a water-based adhesive compound containing a dispersion of the adhesive mixed with a large amount of filler. The filler makes the adhesive only penetrate to a limited depth into the respective surface layers of the webs that are directed towards each other.

9 Claims, 1 Drawing Sheet

METHOD FOR MANUFACTURING A FABRIC-LIKE LAMINATE AND A PRODUCT MANUFACTURED ACCORDING TO SAID METHOD

BACKGROUND OF THE INVENTION

1. Field of the Invention

The present invention relates to a method for manufacturing a fabric-like laminate preferably made of wet-strength-treated tissue paper and a product manufactured according to said method.

2. Description of the Related Art

It is previously known to manufacture a fabric-like material, of paper, in which a plastisol is used as a binder, and quality supplying additional material to laminate two or more layers of tissue paper, the material being suitable for manufacturing table-cloths, having the desired qualities as heaviness, drape, softness and tensile strength. An important reason in using a plastisol is the fact that it is not water-based, whereby those problems are avoided which otherwise are associated with a strong wetting of tissue paper webs.

There is now an interest for environmental reasons to develop alternative laminates manufactured by the aid of water-based binders also having the above-mentioned qualities, such as heaviness, drape, softness and tensile strength.

However, during the development work problems have arisen with respect to the manufacture of well-functioning laminates when water-based binders are used for laminating creped tissue paper, and the manufacturing problems have been enormous. The wetting of the paper has led to softening, swelling and defects in the creping, which in turn has resulted in difficulties with inter alia the guidance of the webs. The finished laminate obtained has had disqualifying stiffness, which has not met the requirements determined concerning drape and softness.

SUMMARY OF THE INVENTION

According to the present invention these drawbacks are eliminated, making it possible to manufacture a product having—for the most part—quality properties corresponding to the products previously known, but which in turn is much cheaper and simpler to manufacture and which, moreover, is better with respect to the environment. The characterizing features of the present invention are stated in the enclosed claims.

Since tissue paper used for manufacturing laminate for table-cloths is negatively affected by strong wetting, the development work has been directed to eliminating the negative effects which can arise in coating of water-based adhesives.

One way to eliminate the problems is to avoid the disturbing effects of wetting even with respect to thin webs.

By the aid of the development work, this condition has now been possible to achieve by certain essential measures according to the invention, which on one hand per se and on the other hand taken together give the desired result.

Partial coating in patterns of preferably lines is one possibility, which can be used in order to attain good functional binding between tissue paper layers without the partial wetting giving injurious influence, since the paper web for the most part remains uninfluenced by the moisture.

The pattern application occurs preferably in a square pattern created by spaced lines, the lines forming for example quadratic or hexagonal shapes.

When the square-line pattern is placed having the "head lines" aligned diagonally over the web, the smallest possible negative wetting effect is obtained, since the creping only constitutes transverse creped folds.

The width of the lines and the size of the squares are adapted to the quality of the tissue paper, apparatus construction, type of adhesive and working conditions in relation to product requirements.

A pattern application as described above is especially suitable for laminating of two tissue paper webs in a first step, as the requirement of the laminate after drying is the fact that it shall be a strong enough to be "stabilizer" in the following laminating to another tissue paper web. This finished laminate consists, in other words, of three layers of tissue paper.

In another embodiment the pattern is made by lines, which mainly extend along the web, especially as lines parallel to the web. The pattern application thus made in the form of longitudinal lines provides the largest possible tensile strength in the longitudinal direction of the tissue paper web after drying. After application, the web passes through a dryer, which dries the web to such a state that the dried adhesive constitutes a swelling-restraining and strength-increasing part of the web, when the web passes into the adhesive application station in the second step in order to be laminated to another tissue paper web. This laminate consists, in other words, of two layers of tissue paper.

The pattern embodiments can be varied as to geometric form and dimension in many ways, but the basic requirement is the fact that such a large binding force and strengthening force, respectively, shall be able to be attained, that this first web has the qualities required for functioning in a following process step at the same time as observable disturbing effects of the laminate intended to be used as table-cloths are not allowed to occur.

The tissue paper used for the laminate for manufacturing of table-cloths is highly creped in order to render greater softness. In order to attain the softness wanted in the laminate, an embodiment is now proposed embodiment having a water-based adhesive compound containing a dispersion adhesive, a large amount of filler and "water-retaining" and viscosity regulating additives suited for a manufacturing equipment working under such conditions that the adhesive only reaches to a limited depth in the surface layer of the tissue paper.

By this limited penetration in the surface layer it is possible in an uncomplicated embodiment only to dry the tissue paper web in the first step, but at that moment to such a low moisture that only the limited adhesive penetration in the second step does not wet this unstrengthened web more than it being able to be a "stabilizer" in the second step. The finished laminate consists in other words of two layers of tissue paper.

The adhesive compound used in the second step contains a large amount of filler in order to give the finished table-cloth so-called drape, i.e. that the table-cloth softly extends over edges and corners in a way which imitates fabric materials.

The filler can be inorganic, such as dolomite, chalk, talc, barium sulphate, titanium dioxide, kaolin, or organic, such as wood meal.

The adhesive compound used in the second step can be made of a type of adhesive and be applied in an amount such that a relatively good water-penetrating barrier is obtained. If, however, a totally water and moisture safe table-cloth material should be required, a leak-proof plastic film laminated between the tissue paper webs is required. Such a film can be inserted either between the two webs in the first step in order to form a three-layer paper laminate or between the two webs in the second step in order to form a two-layer paper laminate.

BRIEF DESCRIPTION OF THE DRAWING

The invention will now be described in further detail below with reference to the enclosed drawing, which schematically shows a section of an apparatus for manufacturing a product according to the present invention.

DESCRIPTION OF THE PREFERRED EMBODIMENTS

Figure 1:
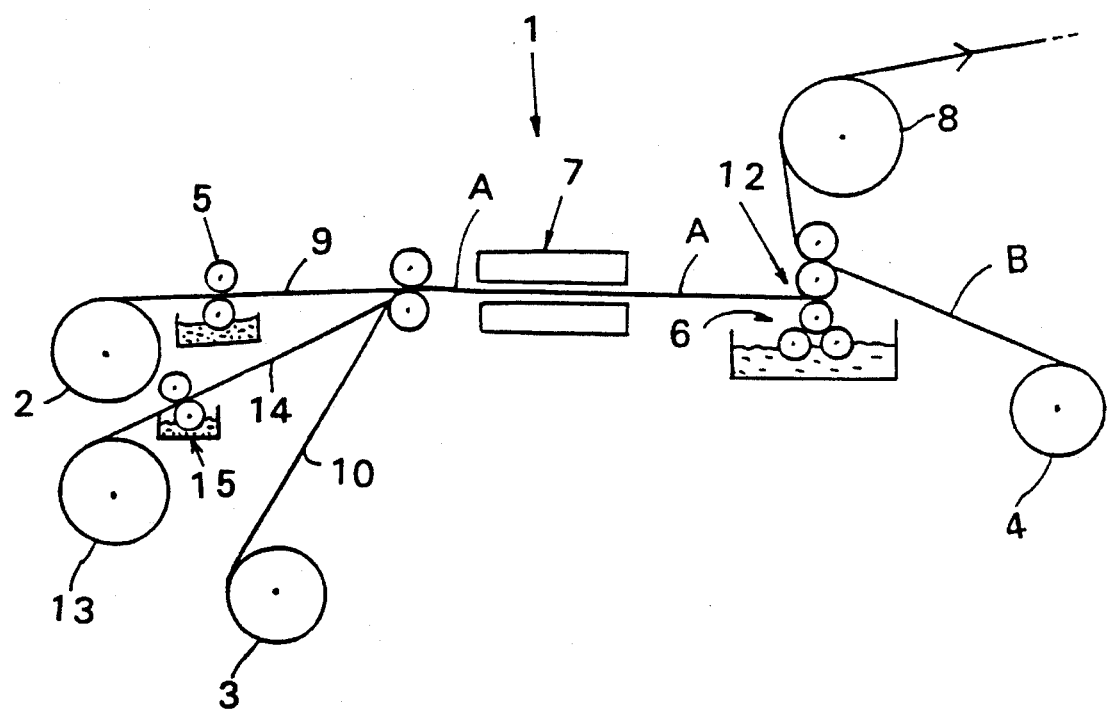
FIG. 1 is a schematic view of the preferred embodiment of a section of the apparatus suitable for making the crepe tissue paper of the present invention.

The drawing illustrates a preferred embodiment of an apparatus 1 according to the present invention consisting of four reel stands 2, 3, 4 and 13, three adhesive applicators 5, 6 and 15, and two dryers 7 and 8.

The method according to a preferred embodiment of the present invention for manufacturing laminates of tissue-paper having a large amount of filler for converting into e.g. table-cloths is made by unwinding a first and a second tissue paper web 9 and 10, respectively, from the reel stands 2 and 3, respectively, and laminating these together into a web A in a first step containing a first nip 11, for example a roller nip, whereafter the laminated web A is dried to a total web strength by the dryer 7. Hereafter the web A is laminated in a second step in a second nip 12, for example a roller nip, together with a further tissue paper web B coming from the reel stand 4 by means of a water based adhesive compound, which after drying by the dryer 8 gives a finished product, which has the required qualities for e.g. table-cloths, such as drape, softness, tensile strength, tear strength, heaviness and opacity.

The application of adhesive can be made by, for example, roller application or spraying. The two tissue paper webs 9 and 10 are preferably wet-strength-treated so that the two-layer laminate manufactured in the first step will function well in the second laminating step and take part in a good final product.

In special cases a thin plastic film 14 is added in order to guarantee a total liquid-tightness of the laminate. The plastic film 14 is applied to the adhesive in the applicator station 15, the adhesive thereafter being adhered against the web 10 in a laminate consisting of three layers of tissue paper. When manufacturing a laminate consisting of two layers of tissue paper the adhesive is applied to the plastic film 14 in the applicator station 6.

The adhesive compound applied in the second step by the aid of the applicator 6 and in the second nip 12 consists of a dispersion adhesive mixed with a filler, which admits penetration into the surface layers of the tissue paper webs directed towards each other, the penetration being made to a manufacturing-related, determined depth at the same time as it renders the material in question a greater binder strength. After drying of the laminate, a final product is obtained, which has the required qualities for e.g. table-cloths, such as drape, heaviness, tensile strength and softness. The filler used in the water-based adhesive compound can be dolomite, chalk, talc, barium sulphate, titanium, dioxide, kaolin or any other suitable substance and the amount of filler can vary between 10 and 120%, counted on the dry latex which is contained in the adhesive compound.

An advantage with, for example, dolomite is the fact that it is basic, so that it neutralizes the acid adhesive and can take part in the neutralization of other acid substances as well, for example during burning.

The application of the water-based adhesive on the web 9 in the first step preferably takes place by pattern application, for example in a square-pattern, having lines, which extend obliquely across the web, so that an adhesive distribution over the web surface is achieved, which after laminating in the nip 11 and drying in the dryer 7 render a good binding between the webs and a full web strength without this laminate A having the defects obtained from earlier manufacturing tests.

The other dryer 8 used during the second step is preferably in the form of a cylinder, the cylinder giving a good smoothing-out effect on the laminate.

Due to the fact that the web A consists of two laminated tissue paper layers, the laminating into the web B in the second step will be made using the water-based adhesive compound in a satisfactorily good way due to the fact that the adhesive compound has a limited penetrating depth in the web surface layers directed against each other, the penetrating depth being manufacturing-related.

The outer layer in the web A, i.e. the tissue paper web 9 and part of the web 10, retains its qualities during the laminating process in the second step, owing to the fact that the adhesive compound here has a limited penetrating depth. The amount of filler can in this step reach at least 10%, counted on dry latex, which exists in the adhesive compound. Tests have also been made using such a large amount of filler as 100–120%, counted on dry latex which exists in the adhesive compound, with a very good result.

The expression "manufacturing-related" in this connection means that a plurality of parameters have importance with respect to the depth of penetration of the adhesive compound in the tissue paper webs against surface layers directed towards each other in the second step. One parameter is the velocity of the web, which in the preferred embodiment is about 120 m/min. Another parameter is the viscosity of the adhesive compound, which is for example temperature-depending—in the example about 20° C.—and which in this case is in the order of 1800 cPs. A third parameter is the moisture in the webs, which can be 6–8%.

Further parameters which have importance for the penetration of the adhesive compound into the surface layers are the wetting qualities of the adhesive web in relation to the qualities of the tissue paper webs in just the surface layer and the layers below this, the temperature of the webs and of the dryer 8 and the surrounding angle for the web around the drying cylinder. Also the nip pressure between the rollers in the nip 12 is of importance.

The method according to another preferred embodiment of the present invention includes pattern application on the web 9, which after drying in the dryer 7 has been provided with a reinforcement by the aid of the dried adhesive in such a way that the dried web A can function well in the following second laminating step.

Thus the product manufactured according to the method for manufacturing of for example table-cloths comprises at least two preferably wet-strength-treated laminated tissue paper webs, the laminated surface layer of the webs directed against each other having an adhesive compound penetrated to a limited depth in the respective surface layer having a filler of the type mentioned above in providing a desired heaviness, drape, softness and tensile strength of the laminate.

I claim:

1. A method for manufacturing a laminate of creped tissue paper, which is wet-strength-treated and which has the required qualities for table-cloths, the method comprising the steps of:

applying an adhesive to a first piece of tissue paper in patterns to form a first web;

laminating said web to a second tissue paper web by means of a water-based adhesive compound containing a dispersion adhesive mixed with a large amount of filler, said first web and said second web each having surface layers, said compound making the adhesive only penetrate to a limited depth into the respective surface layers of the first and second webs directed towards each other.

2. A method according to claim 1, wherein:

the adhesive is water-based, and the step of applying the adhesive is performed by roller coating the adhesive in the form of a spaced pattern.

3. A method according to claim 1, wherein the pattern application in the first step is made in the form of a pattern having squared or hexagonal lines, which extend transversely over the first tissue paper for providing the smallest possible negative effect on the creped tissue paper.

4. A method according to claim 1, wherein the pattern application is made in the form of longitudinal lines for providing the largest possible tensile strength in the longitudinal direction of the first web after drying.

5. A method according to claim 1, further comprising the step of laminating a second piece of tissue paper together with the first piece of tissue paper on which the adhesive is applied in patterns, for forming the first web.

6. A method according to claim 1, further comprising the steps of:

inserting a thin plastic film between the first and the second tissue paper webs; and laminating the thin plastic film to each of the first web and the second web.

7. A laminate of creped tissue paper, which is wet-strength-treated and which has the required qualities for table-cloths, comprising at least first and second tissue paper webs laminated together, a surface of each of said webs being directed towards each other, a water-based adhesive compound with a large amount of filler being applied to said first web and penetrated to a limited depth into said surface of said first web.

8. A laminate according to claim 7, wherein the water-based adhesive compound has a filler in an amount which is variable between 10 and 120%, counted on dry latex in the adhesive compound, said filler being selected from the group consisting of dolomite, chalk, talc, barium sulphate, titanium dioxide, kaolin or wood meal.

9. A laminate according to claim 7, further comprising a plastic film laminated between the tissue paper webs.

* * * * *